Aug. 4, 1964    K. L. E. CEDNÄS    3,143,032
PROJECTION DEVICE FOR PROJECTORS WITH TWIN LENS SYSTEM
Filed June 26, 1962
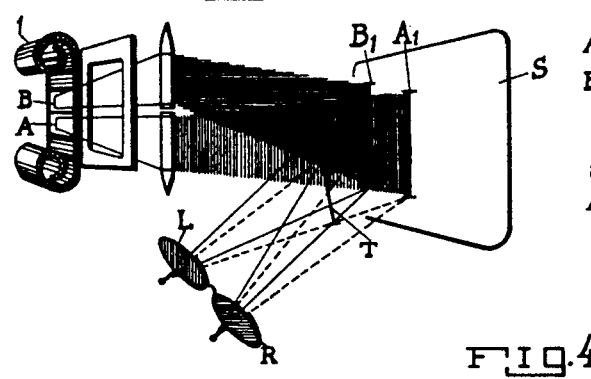
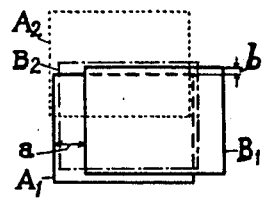
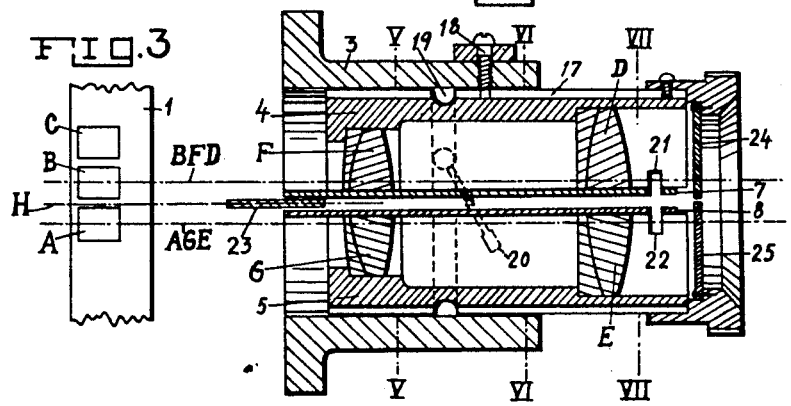
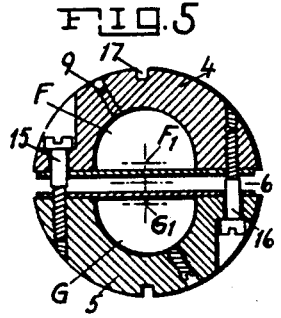
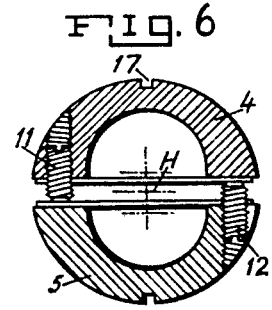
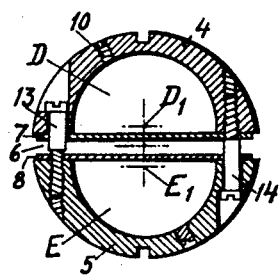

United States Patent Office 3,143,032
Patented Aug. 4, 1964

3,143,032
PROJECTION DEVICE FOR PROJECTORS WITH
TWIN LENS SYSTEM
Karl Lennart Erling Cednäs, Olivedalsgatan 22A,
Gothenburg, Sweden
Filed June 26, 1962, Ser. No. 205,294
4 Claims. (Cl. 88—16.6)

The present invention relates to an improved projection device for projectors fitted with twin lens system for simultaneous projection of two views.

An object of the invention is to provide an adjusting device for the twin lens system of a projector of the said kind, for the purpose of enabling two views to be projected on the screen in exactly the desired relation to each other.

A further object of the invention is to provide an adjusting device for the twin lens system of a projector of the said kind, which aims at facilitating a change of postion of one portion of the twin lens system in relation to the other portion of the said system in such a manner that the adjustment is extremely slight in order to accomplish an exact positioning relative to each other.

A still further object of the invention is to provide an adjusting device for the twin lens system of a projector of the said kind, which makes it possible to change the direction of the central optical line of one portion of the twin lens system in a vertical plane to which the central optical line of the other portion of the twin lens system has a parallel alignment.

With these and other objects in view, the invention comprises such an adjusting device for the twin lens system of projectors of the said kind that for the lenses in the form of segments, in size slightly larger than half lenses, have been provided two holders in the shape of two approximate half portions of a cylinder, one constituting the holder of the lens segments on one side, and the other forming the holder for the lens segments of the other side, the said holder portions being slideably and rotatably journalled in a cylindrical casing or the like, fixed to the projector, with the holders located within the said cylindrical casing and with a hollow space in the horizontal central plane in relation to each other, and adapted to be adjustable in relation to each other by means of an arrangement comprising a set of adjusting screws which, whilst crossing the interspace between the holders, are tangentially located beyond the range of the lens segments on opposite sides of the longitudinal vertical center plane of the system of lenses.

Referring now to the accompanying drawing which indicates a preferred embodiment of my invention, FIG. 1 is a diagrammatical view of the projection method for the purpose of obtaining a stereoscopic effect, and FIG. 2 is a diagrammatical view of the frame adjustment of the pictures projected on the screen.

FIG. 3 is a frontal view of a portion of a film with two frames shown in projection position.

FIG. 4 is a longitudinal cross section of the lens system arrangement according to the invention, and FIGS. 5 to 7 are cross sections of same along the dividing lines V—V, VI—VI and VII—VII in FIG. 4.

The diagrammatically indicated projector in the drawing is of the ordinary type with normal vertical step feed of the film strip 1, one frame at a time, with the difference, however, that at each movement, two frames A, B located one above the other, are simultaneously projected in a horizontally superimposed position on the screen S, with a certain sideways displacement $a$ approximately corresponding to the average distance between the eyes of a spectator, for the purpose of achieving a stereoscopic effect T. The spectator will receive the impression of stereoscopic effect when using eye-glass R, L fitted with lenses of differently polarized glass, each corresponding frame being projected with the corresponding type of light.

The top frame B is projected on the screen as, for example, the image $B_1$ to be seen with the right eye R, whereas the bottom frame A is to be seen as the left eye L image $A_1$ displaced sideways on the screen in relation to each other. When the film moves forward a further step, a new frame C comes into position for projection as the right eye image, whereas the view of frame B will now assume the image on the screen seen by the left eye. The frames in this case constitute pictures taken by an ordinary film camera, and have not been recorded as stereoscopic views. The stereoscopic effect is obtained by the object recorded on the film changing position between each successive frame. Stereoscopic views may also be produced by moving the camera from left to right at such a rate of speed that the movement between two successive exposures constitutes the distance between a pair of eyes. There is nothing to prevent the projector from being used for ordinary projection, however, simply by shutting off the light beam for one of the eye images and removing the polarizer from the other lens channel.

The twin objective used for the purpose is provided with a pair of lenses at the front end, comprising two identical opposingly positioned lens segments D, E, and a pair of lenses at the rear, also comprising two identical opposingly positioned lens segments F. G. By extending past the optical center of the lens, the size of the segments is slightly larger than the exact half, but the term "half lens" has been adopted for use to indicate the nearest description of size. In the present embodiment of the invention, the two half lenses F and D form one portion, the upper, of the twin lens system, whereas the half lenses G and E form the other, or lower portion. The lenses are fixed in a holder of preferably cylindrical circumference, for the purpose of enabling them to be slideably and rotatably fitted in a cylindrical casing 3, attached to the projector. The position of the lens holder in relation to the vertical film is then such that the central horizontal plane H between the two frames B and A in position for projection passes centrally through the lens holder in the longitudinal direction of same, with the result that the holder portion above the plane will include the upper twin portion F and D of the system, whereas the holder portion below the plane, in a similar manner will include the lower twin portion G and E. The central axes of the beams BFD and AGE respectively, which pass through the frames B and A respectively, and whose vertical distance from each other is determined by the frame partitioning on the film, are then, on correct frame adjustment, adapted to pass through—one of them—the optical lens centra $F_1$ and $D_1$ of the upper half lenses, and the other, the optical lens centra $G_1$ and $E_1$ of the lower half lenses. Since the axes of these beams BFD and AGE run absolutely parallel with each other at the same distance from the central plane H, the half lens positions must be adjusted exactly to conform to these beams in order to make it possible to achieve a satisfactory result.

It has been found necessary to arrange for extremely fine lens adjustments to accomplish this setting, and a satisfactory solution of this problem has been achieved in the present invention. For this purpose, the lens holder has been divided into two identical half portions 4 and 5, one of which, 4, is located above the central plane H with the upper half lenses, and the other, 5, below the central plane with the lower half lenses, a central interspace 6 being provided between the two holder portions. The half lenses are disposed in corresponding recesses in the said holder portion, and retained in position preferably by the application of pressure-exerting plates 7, 8, fixed to the longitudinal edges of the holder portions. In order to secure the half lenses against displacement within the holder portions, radial pressure bolts 9, 10, fitted transversely to the circumference of the half lenses, are utilised.

According to the invention, the two holder portions 4, 5 are held together and mutually adjusted by means of a system of adjusting screws and tightening bolts. All the screws of the system form pairs, the individual screws and bolts of which are set diametrically against each other and tangentially directed, whilst crossing the interspace 6 between the portions of the lens holders. The screw pairs are distributed along the longitudinal direction of the lens holder in such a manner that the pair of adjusting screws 11, 12 are located approximately at the central portion of the holder, whereas a pair of tightening bolts 13, 14 are provided close to the front end of the lens holder, and a similar pair close to the rear end of the holder. The adjusting screws are thus disposed in a kind of balancing position between the two pairs of tightening bolts. The tangential positioning of the screws and bolts in pairs makes it possible to achieve a desired alignment whilst still retaining the optical centers of the half lenses substantially in the common central vertical plane, so as for example, in keeping the upper portion in position whilst the lower portion is being adjusted. For this purpose the upper portion is provided with an axial groove 17, which engages a set screw 18 passing through the cylindrical casing 3.

The adjusting screws 11, 12 have a comparatively large diameter and a fine pitched thread, for example, ½ millimeter, so that half a turn will bring about a 0.25 mm. end displacement of the screw, and one-tenth of a turn, 0.05 mm., corresponding to the then produced vertical adjustment of the position of the lower lens holder portion. The tightening bolts, on the other hand, are so designed that they have their ends threaded for engagement with the threads in the opposite lens holder portion, whereas the headed, threadless portion of the shaft of the bolt turns with a certain amount of play in the other holder portion, with the head abutting against the latter. The tightening bolts of one and the same pair are arranged in opposition, the head of one of the bolts being disposed in one of the holder portions, and the head of the other bolt secured in the opposite portion. Consequently, the design and execution of the holder portions can be exactly identical, both permitting a slight amount of play.

Finally, an external annular groove 19 has been provided in both the lens holder portions so as to facilitate a mutual axial displacement from without by means of an indicated lever 20 controlling the movement of both the lens systems for the purpose of adjusting the sharpness of the images. Each one of the two portions is also provided with a slit 21, 22 with their openings facing each other. With the aid of a chisel or the like, introduced simultaneously into the two slits from without, one of the holder portions can be minutely adjusted axially in relation to the other, so as to correct any possible relative difference in the adjustment of the sharpness of the image in either of the two twin lens systems.

As mentioned in the preamble of the description, one of the lens holder portions must absolutely be adjusted in relation to the other in order to obtain the correct position of the images on the screen. This is due to the practical impossibility of an exact manufacture of the half lenses and the determination of the position of their lens axes. The adjusting screws 11, 12 are fitted for the purpose of keeping the holder portions 4, 5 apart, whereas the tightening bolts 13, 14 and 15, 16 respectively, have the object of drawing the holder portions together. Since the holder portions, in the most exact manner of execution in the course of manufacture, are held in a vertical position one above the other by means of the tightening bolts, with the optical center of the half lenses disposed in the central longitudinal middle plane, the most commonly occurring fault is that, of the two images $A_1$, $B_1$ thrown on the screen through the frames A, B, one of them $A_1$, takes up a position, designated $A_2$ in FIG. 2, which deviates in the matter of height, whereas the actual position should be as shown by $A_1$ and $B_1$. An adjustment by hand is not possible, due to the fact that the slightest disturbance of the positioning of the lens holder portion in the most incalculable manner changes the position of the image in grossly enlarged scale on the screen.

Whilst observing the above-mentioned fact, the real significance of the adjustment is the setting to parallelism of the optical center line between the two lowest half lenses, with the optical center line of the two uppermost half lenses at a distance corresponding to the partitioning of the frames. In these circumstances it is necessary to use a method of trial and error whilst the projector is throwing an image on the screen. The tightening bolts are then slightly slackened, and the adjustment is effected by the minutest possible trial turns of the adjusting screws. When a satisfactory adjustment has been achieved, the tightening bolts are re-set in normal position. Prior to this adjustment, the sharpness of the image has been put right by axial displacement of the lens holder member by means of the control lever 20 and by adjustment of the difference in the setting of the lens holder portions axially in relation to each other with the aid of the slits 21, 22.

Subsequent to the adjustment, the lens holder member should be turned very slightly on its longitudinal axis for the purpose of adjusting the relative sideways positioning of the images $A_1$, $B_2$ on the screen, which images in the main cover each other, to the positions $A_1$, $B_1$ with the indicated eye separating space $a$. This is accomplished by a slight turning and pressing interference movement in the axial groove 17 by means of a chisel or the like. The guide screw 18 has a sufficient amount of play for this minute turning movement to be accomplished. As far as the height is concerned, the top edges of the two images will be set at a distance $b$ from each other, which is equal to the frame partitioning on the film.

When the final adjustment is thus completed, the two lens holder portions are rigidly and inseparably joined together by known means, such as for example, by the introduction of some hard-setting plastic padding in the interspace between the holder portions.

Projecting rearwards from the interspace between the lens holder portions there is a beam separating disc 23 fitted for the purpose of separating the projection beams from the two simultaneous frames. At the front end, the lens holder member is provided with a pushed-on ring, fitted with polarization discs 24, 25 of different nature, one for each beam passing through the lens holder member.

If this ring is removed, and a similar member inserted wherein the polarizer 24 has been taken out, and the polarizer 25 is replaced by an opaque metal plate, it is possible to use the twin lens system projector for projection of ordinary two-dimensional pictures.

In the drawing and specification there is set forth a preferred embodiment to exemplify the invention and not for purposes of limitation, the scope of the invention being defined in the claims.

What I claim is:

1. A projection device for projectors fitted with a twin lens system for simultaneous projection of two images from a vertically propelled film band, said lens system comprising a number of lenses on one side of the horizontal central plane of the lens system forming one of the portions of the twin lens system, and an equal number of corresponding lenses forming the other portion of the said twin lens system on the opposite side of the horizontal central plane, positioned in pairs with the first mentioned lenses, each pair of lenses being positioned one behind the other, and the lenses being in the shape of segments in size slightly larger than half lenses, two holders having the shape of approximate half portions of a cylinder carrying the lenses, one of the holder portions housing the lens segments of one side, and the other holder portion housing the lens segments of the other side, a cylindrical casing fixed to the projector and in which said holder portions are slidably and rotatably mounted, said holder portions being located within said casing so as to provide an interspace therebetween in the horizontal central plane, adjusting screws and tightening bolts cooperable with said holder portions for adjusting said portions relative to each other, said adjusting screws and tightening bolts while crossing the interspace being tangentially disposed beyond the range of the lens segments on opposite sides of the vertical longitudinal middle plane of the lens system, said adjusting screws and tightening bolts being arranged in pairs with each pair being set opposite each other on opposite sides of the vertical longitudintal middle plane of the lens system, and a pair of adjusting screws being disposed between each pair of tightening bolts thereby permitting a tilting adjustment around the adjusting screws of one holder portion in relation to the other while retaining the optical axis of each holder portion in one and the same vertical plane.

2. A projection device according to claim 1, in which at least one of the holder portions is provided with an axial channel, a guide pin on the casing engageable with said channel so as to act as a guide to sharpness of image position when the axial displacement of the holder portions is being effected, said guide pin engaging the axial channel with such an amount of play that a slight mutual turning of the holder portions may allow the sideways adjustment of the screened images in relation to each other.

3. A projection device according to claim 1, in which the head of each respective tightening bolt counterholds without threads one of the holder portions when screwed into the opposite holder portion, the threadless portion of the bolt allowing such an amount of play that it facilitates a slight sideways adjustment of the first mentioned holder portion up to the stem of the bolt when said bolts are slackened, and permitting also a minute axial displacement of one of the holder portions in relation to the other.

4. A projection device according to claim 3, in which the screws of each respective pair are screwed into the respective counterpart of the holder portions, thus making it possible for the adjusting screws to allow one of the holder portions to be turned in either direction, and also permitting a parallel adjustment vertically in connection with the turning and securing of the tightening bolts.

References Cited in the file of this patent
UNITED STATES PATENTS

| | | |
|---|---|---|
| 1,741,385 | Thomas | Dec. 31, 1929 |
| 1,922,963 | Lane et al. | Aug. 15, 1933 |
| 1,984,953 | Thomas | Dec. 18, 1934 |
| 2,336,938 | Keijzer | Dec. 14, 1943 |